United States Patent
Fabian et al.

(10) Patent No.: US 9,022,667 B2
(45) Date of Patent: May 5, 2015

(54) PIN AND SOCKET TERMINUS ASSEMBLIES FOR TERMINATING OPTICAL CABLES

(71) Applicant: Tyco Electronics Corporation, Berwyn, PA (US)

(72) Inventors: David James Fabian, Mount Joy, PA (US); Jun Li, Harrisburg, PA (US); James Patrick Mosier, Palmyra, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 139 days.

(21) Appl. No.: 13/667,525

(22) Filed: Nov. 2, 2012

(65) Prior Publication Data
US 2014/0126858 A1    May 8, 2014

(51) Int. Cl.
*G02B 6/38*         (2006.01)
*G02B 6/02*         (2006.01)

(52) U.S. Cl.
CPC .......... *G02B 6/3809* (2013.01); *G02B 6/02033* (2013.01); *G02B 6/3801* (2013.01); *G02B 6/3821* (2013.01); *G02B 6/3846* (2013.01); *G02B 6/3878* (2013.01); *G02B 6/3887* (2013.01)

(58) Field of Classification Search
CPC .. G02B 6/3825; G02B 6/3893; G02B 6/3885; G02B 6/3897; G02B 6/3821; G02B 6/38
USPC .......... 385/53, 55, 56, 58, 59, 60, 62
See application file for complete search history.

(56) References Cited

U.S. PATENT DOCUMENTS

| 4,253,730 | A | 3/1981 | Logan et al. | |
|---|---|---|---|---|
| 5,337,385 | A | 8/1994 | Baderschneider et al. | |
| 6,244,752 | B1 | 6/2001 | Besler et al. | |
| 6,543,941 | B1 * | 4/2003 | Lampert | 385/58 |
| 7,341,382 | B2 * | 3/2008 | Dye | 385/78 |
| 7,465,103 | B1 * | 12/2008 | Tsai | 385/53 |

FOREIGN PATENT DOCUMENTS

| EP | 0 024 958 A1 | 3/1981 |
|---|---|---|
| EP | 1 211 537 A2 | 6/2002 |
| EP | 2 138 880 A1 | 12/2009 |
| WO | 92 / 14179 A1 | 8/1992 |

OTHER PUBLICATIONS

International Search Report, International Application No. PCT/US2013/067365 International Filing Date, Oct. 30, 2013.

* cited by examiner

*Primary Examiner* — Jennifer Doan

(57) ABSTRACT

An optical cable assembly includes an optical cable having an end. The optical cable includes a plastic optical fiber (POF) having a tip segment that includes a tip surface. The optical cable assembly also includes a socket terminus assembly that terminates the end of the optical cable and is configured to mate with a pin terminus assembly. The socket terminus assembly includes a terminus body having a cable passage. At least a portion of the end of the optical cable extends within the cable passage such that the tip surface of the tip segment of the POF is configured to engage a mating POF of the pin terminus assembly to optically couple the POF to the mating POF.

13 Claims, 11 Drawing Sheets

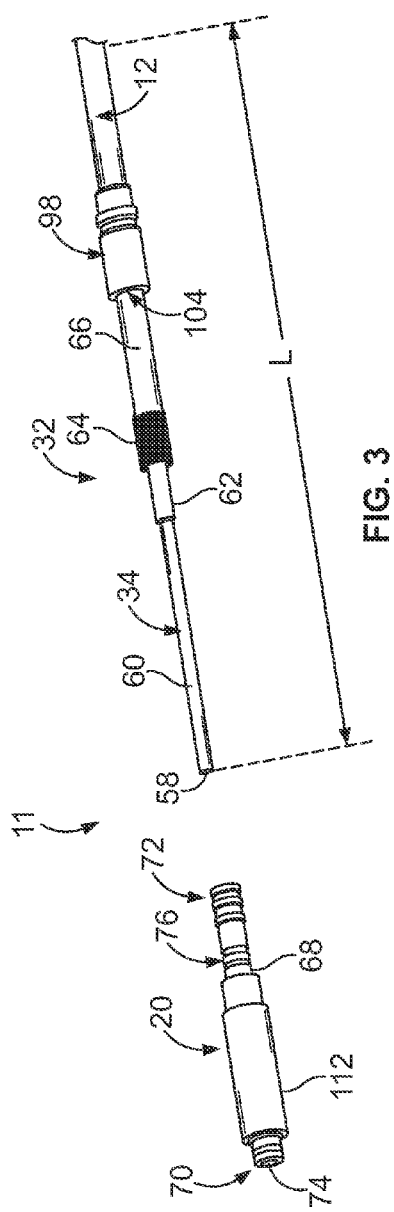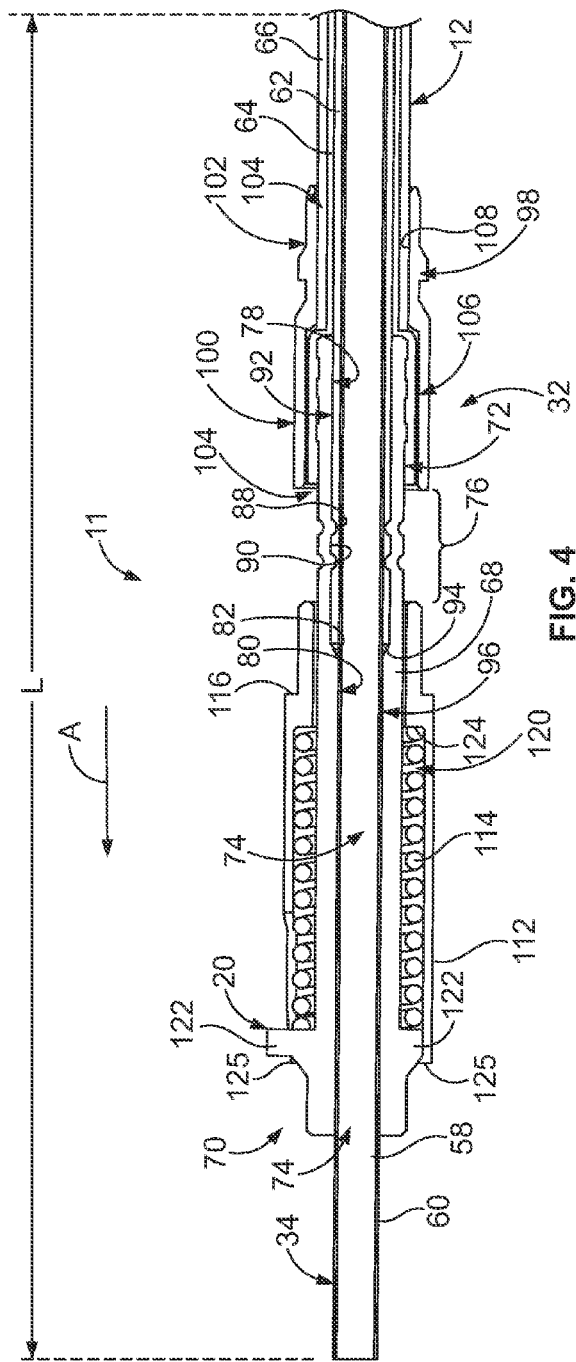

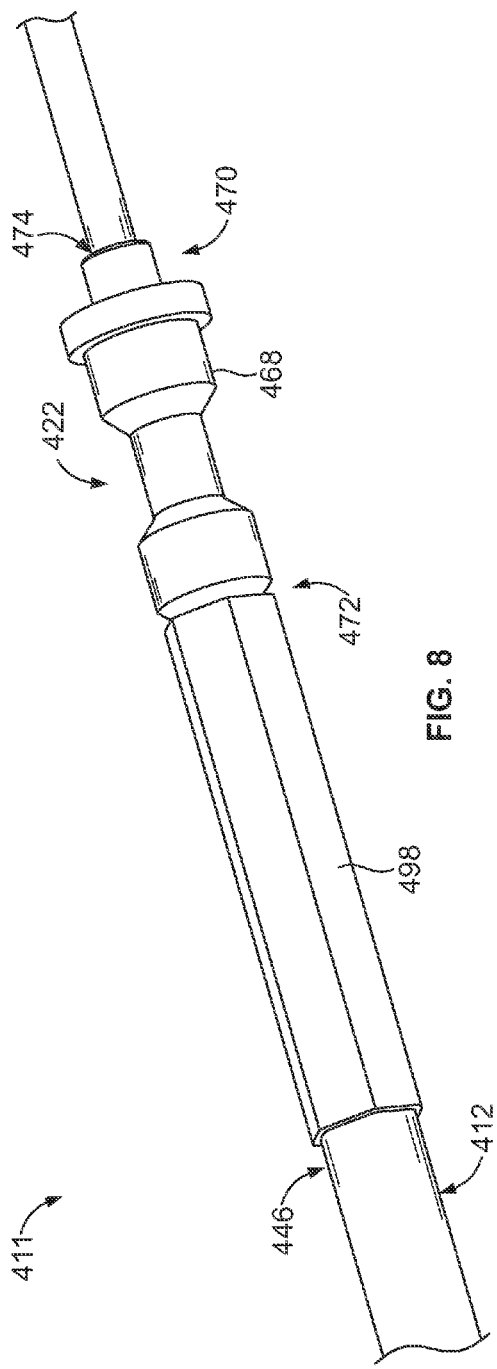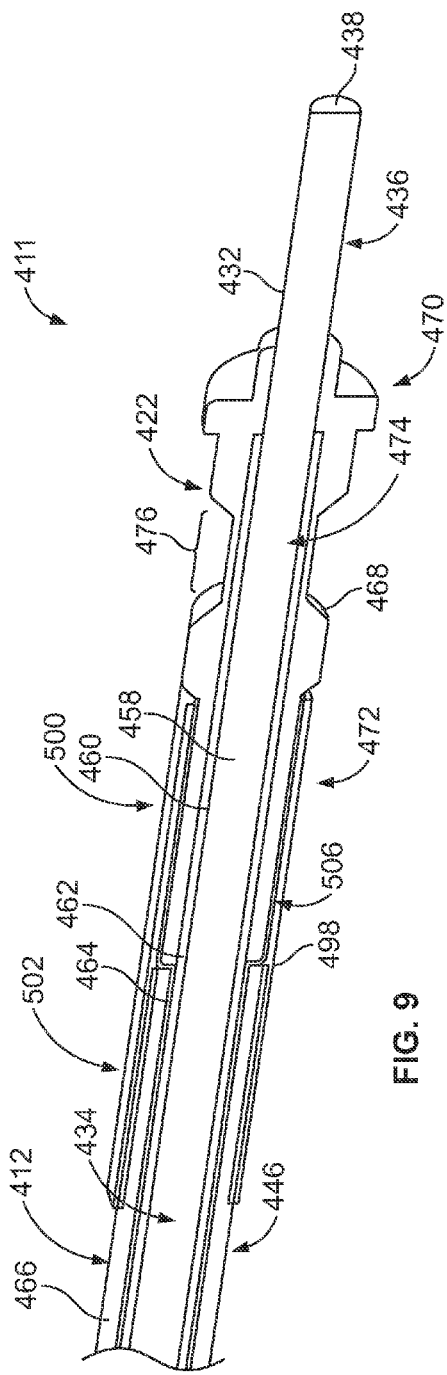

PIN AND SOCKET TERMINUS ASSEMBLIES FOR TERMINATING OPTICAL CABLES

BACKGROUND OF THE INVENTION

The subject matter herein relates generally to terminus assemblies that terminate optical cables.

Connector systems are often used to optically couple two optical cables to each other. Within such connector systems, the optical cables are terminated by complementary terminus assemblies that mate together to establish an optical connection between the optical cables. At least some known terminus assemblies that terminate optical cables include a terminus body having a cable passage that receives an end of the corresponding optical cable. The optical cable end is held within the cable passage such that a tip segment of a glass optical fiber of the optical cable is exposed for mating with the complementary terminus assembly. More specifically, the tip segment of the glass optical fiber optically couples to a tip segment of a glass optical fiber of the other optical cable, which is held by the complementary terminus assembly.

Known terminus assemblies that terminate optical cables are not without disadvantages. For example, the tip segments of the glass optical fibers must be sufficiently aligned to optically couple to each other. Accordingly, at least some known terminus assemblies include components that facilitate aligning the tip segments when the terminus assemblies are mated together. For example, the tip segments of the glass optical fibers may optically couple together within a mating receptacle of the connector system. The mating receptacle may include an alignment sleeve that aligns the tip segments relative to each other as the complementary terminus assemblies are mated together. Moreover, and for example, the terminus assemblies may include ferrules that extend around the tip segments of the glass optical fibers to align the tip segments relative to each other as the complementary terminus assemblies are mated together. But, such alignment components may increase a cost and/or complexity of the connector system and/or the complementary terminus assemblies thereof. For example, the ferrules may be secured to the tip segments of the glass optical fibers using an epoxy, which may be time-consuming and/or labor intensive. Moreover, such alignment components may decrease a reliability of the connector system and/or the complementary terminus assemblies thereof. For example, the alignments sleeves and/or ferrules may be fragile components that may be prone to failure.

BRIEF DESCRIPTION OF THE INVENTION

In one embodiment, an optical cable assembly includes an optical cable having an end. The optical cable includes a plastic optical fiber (POF) having a tip segment that includes a tip surface. The optical cable assembly also includes a socket terminus assembly that terminates the end of the optical cable and is configured to mate with a pin terminus assembly. The socket terminus assembly includes a terminus body having a cable passage. At least a portion of the end of the optical cable extends within the cable passage such that the tip surface of the tip segment of the POF is configured to engage a mating POF of the pin terminus assembly to optically couple the POF to the mating POF.

In another embodiment, an optical cable assembly includes an optical cable having an end. The optical cable includes a plastic optical fiber (POF) having a tip segment. The optical cable assembly also includes a socket terminus assembly that terminates the end of the optical cable. The socket terminus assembly includes a terminus body having a cable passage. At least a portion of the end of the optical cable extends within the cable passage. The socket terminus assembly includes a hood having a mating receptacle that extends from the cable passage of the terminus body. The mating receptacle is defined by an interior wall of the hood. The tip segment of the POF extends within the mating receptacle for optically coupling to a mating POF of a pin terminus assembly. A radially outer surface of the tip segment of the POF is engaged with the interior wall of the hood within the mating receptacle.

In another embodiment, an optical connector system is provided. The optical connector assembly includes first and second optical cables having ends. The first and second optical cables include first and second plastic optical fibers (POFs), respectively. Each of the first and second POFs includes a tip segment having a tip surface. The optical connector assembly also includes a socket terminus assembly that terminates the end of the first optical cable. The socket terminus assembly includes a mating receptacle. The first optical cable is held by the socket terminus assembly such that the tip surface of the tip segment of the first POF is exposed within the mating receptacle. The optical connector assembly also includes a pin terminus assembly that terminates the end of the second optical cable. The pin terminus assembly includes a mating end. The second optical cable is held by the pin terminus assembly such that the tip segment of the second POF extends outwardly from the mating end of the pin terminus assembly. The pin terminus assembly is mated with the socket terminus assembly such that the tip segment of the second POF is received within the mating receptacle of the socket terminus assembly and such that the tip surface of the second POF is engaged with, and thereby optically connected to, the tip surface of the first POF.

In another embodiment, an optical cable assembly includes an optical cable having an end. The optical cable includes a plastic optical fiber (POF) having a tip segment. The optical cable assembly also includes a pin terminus assembly that terminates the end of the optical cable. The pin terminus assembly includes a terminus body that extends from a mating end to a cable end. The terminus body has a cable passage. At least a portion of the end of the optical cable is held within the cable passage such that the tip segment of the POF extends outwardly from the mating end of the terminus body for optically coupling to a mating POF of a socket terminus assembly. The pin terminus assembly does not include a ferrule that extends around the tip segment of the POF.

BRIEF DESCRIPTION OF THE DRAWINGS

FIG. 3 is an exploded perspective view of an exemplary embodiment of an optical cable assembly of the optical connector system shown in FIGS. 1 and 2.

FIG. 4 is a cross-sectional view of the optical cable assembly shown in FIG. 3.

FIG. 8 is a perspective view of an exemplary embodiment of a pin optical cable assembly that is configured to mate with the socket optical cable assembly shown in FIGS. 6 and 7.

FIG. 9 is a cross-sectional view of the pin optical cable assembly shown in FIG. 8.

DETAILED DESCRIPTION OF THE INVENTION

Figure 1:
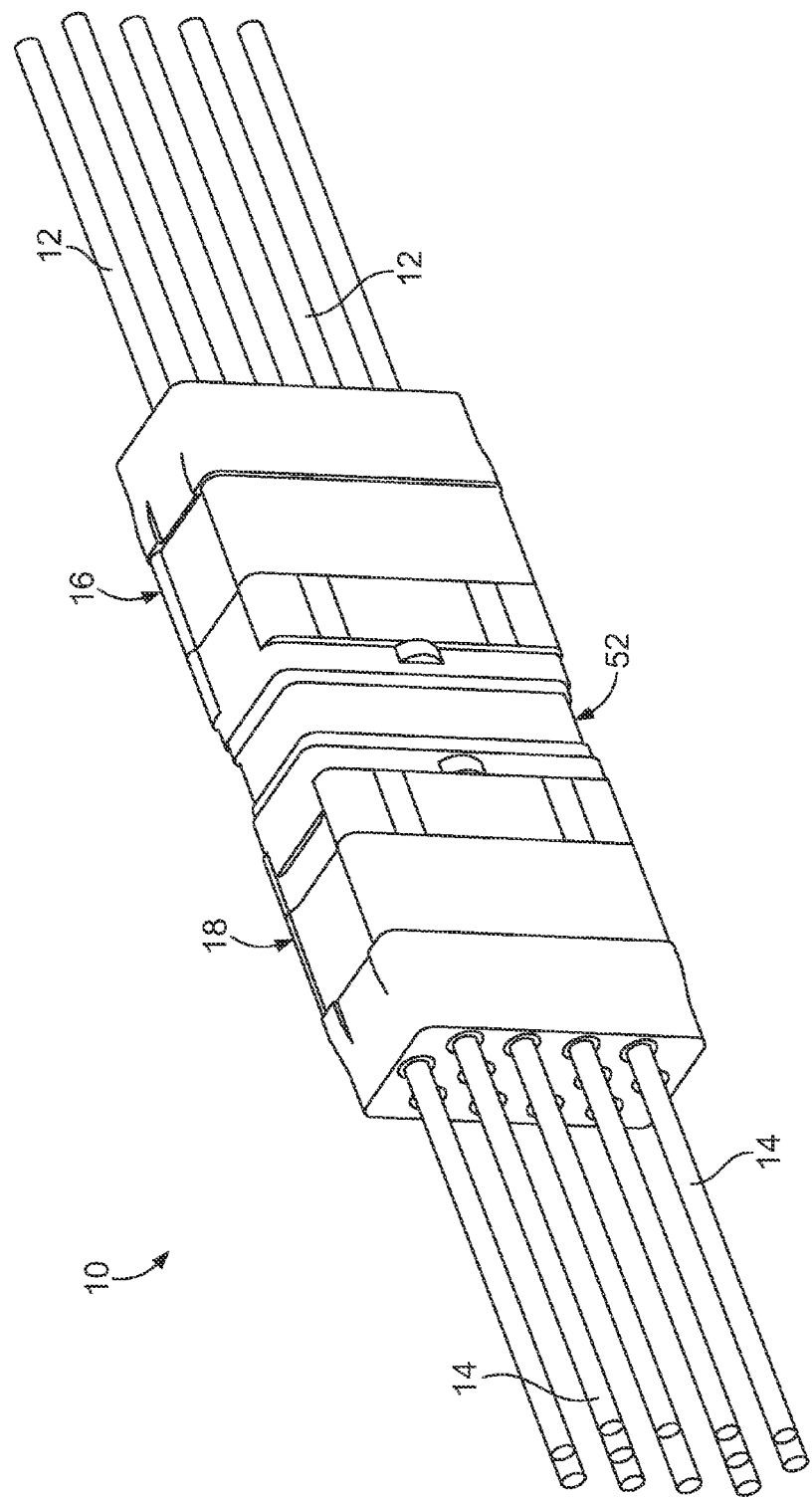
FIG. 1 is a perspective view of an exemplary embodiment of an optical connector system.
Figure 2:
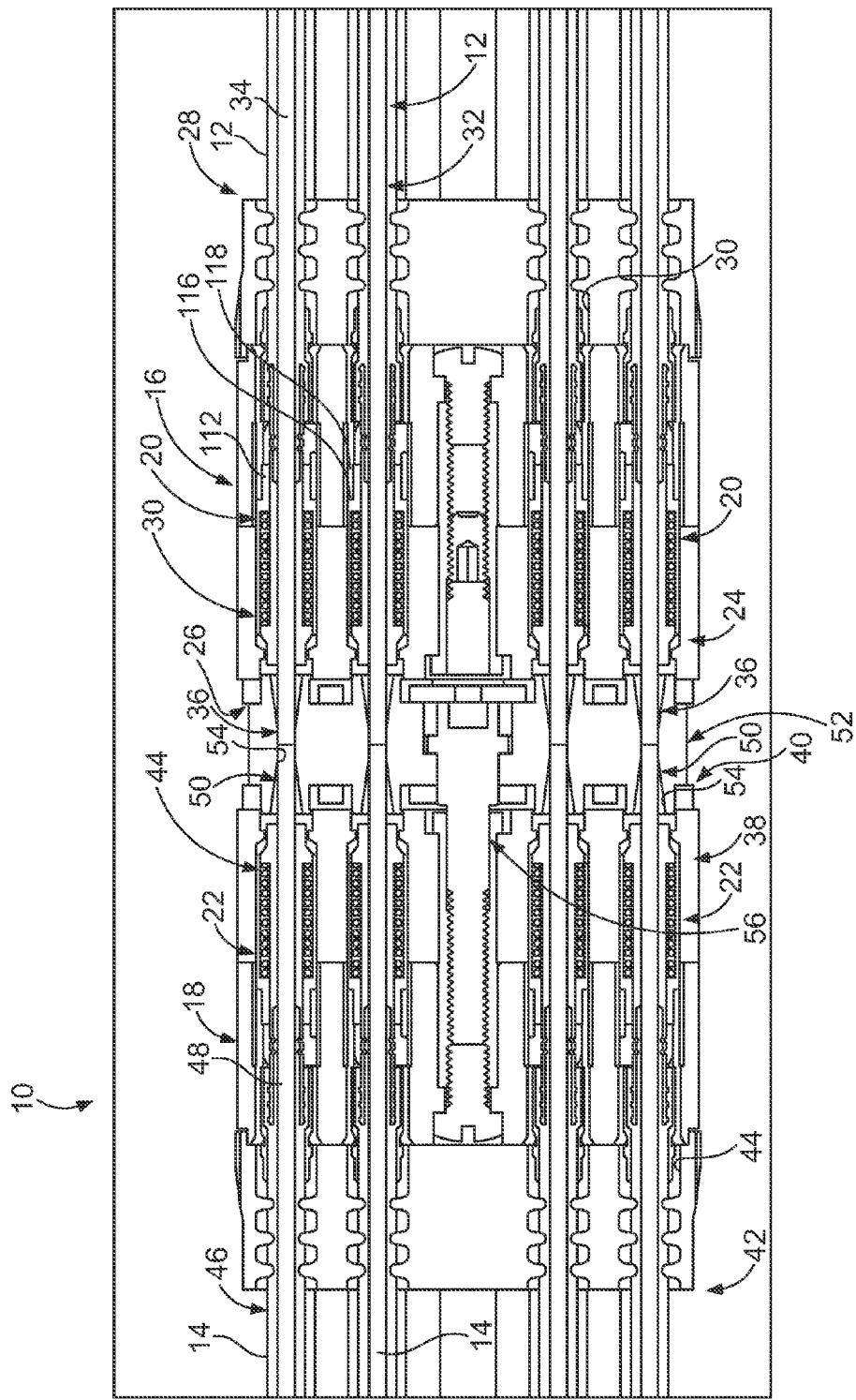
FIG. 2 is a cross-sectional view of the optical connector system shown in FIG. 1.

FIG. 1 is a perspective view of an exemplary embodiment of an optical connector system 10. FIG. 2 is a cross-sectional view of the optical connector system 10. Referring to FIGS. 1 and 2, the connector system 10 includes a plurality of optical cables 12, a plurality of optical cables 14, a connector assembly 16, a connector assembly 18, and an alignment block 52. The connector assembly 16 includes a plurality of (fiber optic) terminus assemblies 20 (not visible in FIG. 1) that terminate the optical cables 12. The connector assembly 18 includes a plurality of (fiber optic) terminus assemblies 22 (not visible in FIG. 1) that terminate the optical cables 14. The optical connector system 10 may be adapted for use in military applications, aerospace applications, automotive applications, industrial applications, commercial applications, and/or the like.

Referring now solely to FIG. 2, the connector assembly 16 includes a connector housing 24 that extends from a connector mating end 26 to a connector cable end 28. The housing 24 includes a plurality of circuit openings 30. Each of the circuit openings 30 holds a corresponding terminus assembly 20 therein. Each terminus assembly 20 terminates an end 32 of a corresponding optical cable 12. As will be described below, the optical cables 12 include plastic optical fibers (POFs) 34 that include tip segments 36. The terminus assemblies 20 terminate the optical cables 12 and are held within the circuit openings 30 such that the tip segments 36 of the POFs 34 extend outwardly from the connector mating end 26 of the connector housing 24.

The connector assembly 18 includes a connector housing 38 that extends from a connector mating end 40 to a connector cable end 42. The connector housing 38 includes a plurality of circuit openings 44 that hold corresponding terminus assemblies 22 therein. Each terminus assembly 22 terminates an end 46 of a corresponding optical cable 14. The optical cables 14 include POFs 48 having tip segments 50. The terminus assemblies 22 terminate the optical cables 14 and are held within the circuit openings 44 such that the tip segments 50 extend outwardly from the connector mating end 40 of the connector housing 38.

The optical connector system 10 also includes the alignment block 52. The connector assemblies 16 and 18 mate together via the alignment block 52. The alignment block 52 is mounted between the connector assemblies 16 and 18 when the connector assemblies 16 and 18 are mated together as shown in FIG. 2. More specifically, in the exemplary embodiment, the alignment block 52 is mounted to the connector mating end 40 of the connector housing 38. Alternatively, the alignment block 52 is mounted to the connector mating end 26 of the connector housing 24. When the connector assemblies 16 and 18 are mated together, the alignment block 52 extends outwardly from each of the connector mating ends 26 and 40 (toward the other connector mating end 26 or 40).

The alignment block 52 includes a plurality of mating receptacles 54 that extend through the alignment block 52. The POF tip segments 36 of the optical cables 12 terminated by the terminus assemblies 20 extend within corresponding mating receptacles 54 of the alignment block 52. Similarly, the POF tip segments 50 of the optical cables 14 terminated by the terminus assemblies 22 extend within corresponding mating receptacles 54. Corresponding tip segments 36 and 50 are aligned within the corresponding mating receptacle 54 such that the corresponding tip segments 36 and 50 are optically connected together, as will be described below.

The alignment block 52 is optionally secured to the connector housings 24 or 38 via a lock feature 56. In the exemplary embodiment, the lock feature 56 includes a threaded fastener assembly, but the lock feature 56 may additionally or alternatively include any other structure, means, and/or the like, such as, but not limited to, a latch and/or the like. In the exemplary embodiment, the alignment block 52 is considered a component of the connector assembly 18. But, the alignment block 52 may be considered a component of the connector assembly 16.

FIG. 3 is a perspective view of an exemplary embodiment of an optical cable assembly 11 (not labeled in FIG. 2) of the optical connector system 10. FIG. 4 is a cross-sectional view of the optical cable assembly 11. The optical cable assembly 11 includes one of the terminus assemblies 20 and the corresponding optical cable 12 that is terminated thereby. The optical cable 12 includes the end 32, which extends a length L, and the POF 34. In the exemplary embodiment, and as best seen in FIG. 4, the POF 34 includes a plastic core 58 and optionally includes a cladding 60 that surrounds the plastic core 58. The plastic core 58 is configured to transmit, or propagate, light (e.g., optical signals) along the length of the POF 34. The optical cable 12 includes a buffer 62, a strength member 64, and a jacket 66. The buffer 62 surrounds the POF 34 along a portion of the length L of the optical cable end 32. The strength member 64 surrounds the buffer 62 along a portion of the length L of the end 32 of the optical cable 12. The jacket 66 surrounds the strength member 64 along a portion of the length L of the optical cable end 32.

The buffer 62 may be fabricated from any material(s) and may include any structure, such as, but not limited to, polyolefin, another polymer, and/or the like. The strength member 64 and the jacket 66 may each be fabricated from any material(s) and may each include any structure. For example, the strength member 64 may be, but is not limited to being, a yarn, a braid, a sheath, and/or the like. The jacket 66 may be, but is not limited to being, perfluoroalkoxy (PFA), polytetrafluoroethylene (PTFE), another polymer, and/or the like. In the exemplary embodiment, each of the optical cables 14 is substantially similar to the optical cables 12. Accordingly, the optical cables 14 will not be described in greater detail herein.

The terminus assembly 20 includes a terminus body 68 that extends a length from a terminus body mating end 70 to a terminus body cable end 72. The terminus body 68 includes a cable passage 74 and a crimp zone 76. At least a portion of the end 32 of the optical cable 12 extends within the cable passage 74. The cable passage 74 extends a length through the terminus body 68. Referring now solely to FIG. 4, the cable passage 74 optionally includes a larger-diameter segment 78 and a reduced-diameter segment 80 that has a reduced diameter relative to the larger-diameter segment 78. A shoulder 82 of the terminus body 68 that extends radially inwardly within the cable passage 74 is defined at the intersection between the larger-diameter segment 78 and the reduced-diameter segment 80. The crimp zone 76 of the terminus body 68 extends along the larger-diameter segment 78 of the cable passage 74.

The optical cable end 32 includes a buffer segment 92 along which the buffer 62 surrounds the POF 34. The buffer 62 includes a buffer end 94 that defines an end of the buffer segment 92. The end 32 of the optical cable 12 also includes a POF segment 96 wherein the POF 34 is exposed from the buffer 62. The optical cable end 32 extends within the cable passage 74 of the terminus body 68 such that the terminus body 68 surrounds the buffer 62 of the optical cable 12 at the crimp zone 76, as can be seen in FIG. 4. In other words, the crimp zone 76 of the terminus body 68 extends along and surrounds a portion of the buffer segment 92 of the optical cable end 32. The buffer segment 92 of the optical cable end 32 extends within the larger-diameter segment 78 of the cable passage 74, while the POF segment 96 of the optical cable end 32 extends within the reduced-diameter segment 80 of the cable passage 74. The buffer end 94 of the buffer 62 is engaged with the shoulder 82 of the terminus body 68.

The terminus body 68 is crimped over the buffer 62 of the optical cable 12 at the crimp zone 76, as is shown in FIG. 4. When crimped over the buffer 62, an interior surface 90 of the terminus body 68 is engaged with the buffer 62. Accordingly, the terminus body 68 is engaged with the buffer 62 at the crimp zone 76. Optionally, and as can be seen in FIG. 4, the crimp forms projections 88 on the interior surface 90 of the terminus body 68. The projections 88 engage and partially compress the buffer 62 when the connector body 68 is crimped over the buffer 62. The crimp between the terminus body 68 and the buffer 62 mechanically connects the terminus body 68 to the buffer 62, and thereby to the end 32 of the optical cable 12. The compression of the buffer 62 by the projections 88 may facilitate forming a stronger mechanical connection between the terminus body 68 and the buffer 62. Any type of crimp having any structure may be used, such as, but not limited to, a hexagonal crimp, a ⅘ indent crimp, a circular crimp, a triangular crimp, a crimp formed by opposing and parallel jaws, and/or the like.

The terminus assembly 20 includes a crimp sleeve 98 that extends a length that includes a terminus segment 100 and a cable segment 102. The crimp sleeve 98 can also be seen in FIG. 3. The crimp sleeve 98 includes a central passage 104 that extends through the length of the crimp sleeve 98. As shown in FIG. 4, the strength member 64 of the optical cable 12 includes a member segment 106 that extends over at least a portion of the cable end 72 of the terminus body 68. The crimp sleeve 98 extends around the cable end 72 of the terminus body 68 and around the portion of the optical cable end 32 that extends outwardly from the terminus body cable end 72. The cable end 72 of the terminus body 68 and the member segment 106 of the strength member 64 that extends over the terminus body cable end 72 are received within the central passage 104 of the crimp sleeve 98 along the terminus segment 100 of the crimp sleeve 98. In other words, the terminus segment 100 of the crimp sleeve 98 surrounds the cable end 72 of the terminus body 68 and the member segment 106 of the strength member 64 that extends over the terminus body cable end 72. The portion of the optical cable end 32 that extends outwardly from the cable end 72 of the terminus body 68 is received within the central passage 104 of the crimp sleeve along the cable segment 102 such the cable segment 102 surrounds the jacket 66 of the optical cable 12.

As shown in FIG. 4, the crimp sleeve 98 is crimped over the cable end 72 of the terminus body 68 and the member segment 106 of the strength member 64 that extends over the cable end 72. More specifically, the terminus segment 100 of the crimp sleeve 98 is crimped over the terminus body cable end 72 and the member segment 106. When crimped over the terminus body cable end 72 and the member segment 106, an interior surface 108 of the crimp sleeve 98 is engaged with the member segment 106 of the strength member 64. Accordingly, the crimp sleeve 98 is engaged with the member segment 106 of the strength member 64 at the terminus segment 100 of the crimp sleeve 98. The crimp between the crimp sleeve 98 and the member segment 106 of the strength member 64 mechanically connects the cable end 72 of the terminus body 68 to the member segment 106 of the strength member 64 and mechanically connects the member segment 106 to the terminus segment 100 of the crimp sleeve 98. The crimp between the crimp sleeve 98 and the member segment 106 thereby mechanically connects the cable end 72 of the terminus body 68 to the optical cable 12. Any type of crimp having any structure may be used, such as, but not limited to, a hexagonal crimp, a ⅘ indent crimp, a circular crimp, a triangular crimp, a crimp formed by opposing and parallel jaws, and/or the like.

The crimp sleeve 98 is also crimped over the portion of the optical cable end 32 that extends outwardly from the cable end 72 of the terminus body 68, as shown in FIG. 4. More specifically, the cable segment 102 of the crimp sleeve 98 is crimped over the portion of the optical cable end 32 that extends outwardly from the cable end 72 of the terminus body 68. When crimped over the portion of the optical cable end 32 that extends outwardly from the terminus body cable end 72, the interior surface 108 of the crimp sleeve 98 is engaged with the jacket 66 of the optical cable 12. The crimp sleeve 98 is thus engaged with the jacket 66 at the cable segment 102. The crimp between the crimp sleeve 98 and the jacket 66 of the optical cable 12 mechanically connects the jacket 66 to the cable segment 102 of the crimp sleeve 98. Accordingly, the crimp between the crimp sleeve 98 and the jacket 66 mechanically connects the cable segment 102 of the crimp sleeve 98 to the optical cable 12. Any type of crimp having any structure may be used, such as, but not limited to, a hexagonal crimp, a ⅘ indent crimp, a circular crimp, a triangular crimp, a crimp formed by opposing and parallel jaws, and/or the like.

The terminus assembly 20 optionally includes the terminus body 68, a terminus shell 112, and a biasing mechanism 114. The terminus shell 112 can also be seen in FIG. 3. The terminus shell 112 extends around the terminus body 68. More specifically, the terminus shell 112 extends around the mating end 70 of the terminus body 68. The terminus shell 112 includes a lock shoulder 116 that cooperates with a lock feature 118 (FIG. 2) that resides internally within the connector housing 24 (FIGS. 2 and 5) to hold the terminus assembly 20 within the corresponding circuit opening 30 (FIGS. 2 and 5) of the connector housing 24. The biasing mechanism 114 is held within a cavity 120 that extends between the terminus body 68 and the terminus shell 112. In the exemplary embodiment, the biasing mechanism 114 extends within the cavity 120 between a flange 122 of the terminus body 68 and a flange 124 of the terminus shell 112. The biasing mechanism 114 biases the terminus shell 112 to a locked position (shown in FIG. 4). In the locked position, a flange 125 of the terminus shell 112 is engaged with the flange 122 of the terminus body 68. The terminus shell 112 is moveable relative to the terminus body 68, and against the bias provided by the biasing mechanism 114, in a direction A away from the minimally biased locked position shown in FIG. 4. In the exemplary embodiment, the biasing mechanism 114 is a coil spring, but the biasing mechanism 114 may additionally or alternatively include any other type of biasing mechanism.

Referring again to FIG. 2, the terminus assemblies 22 are substantially similar to the terminus assemblies 20. Accordingly, the terminus assemblies 22 will not be described in more detail herein. The terminus assembly 20 shown in FIGS. 3 and 4 is held within the corresponding circuit opening 30 of the connector housing 24 of the connector assembly 18. The lock shoulder 116 of the terminus shell 112 is engaged with the lock feature 118 of the connector housing 24 to secure the terminus assembly 20 within the corresponding circuit opening 30.

Figure 5:
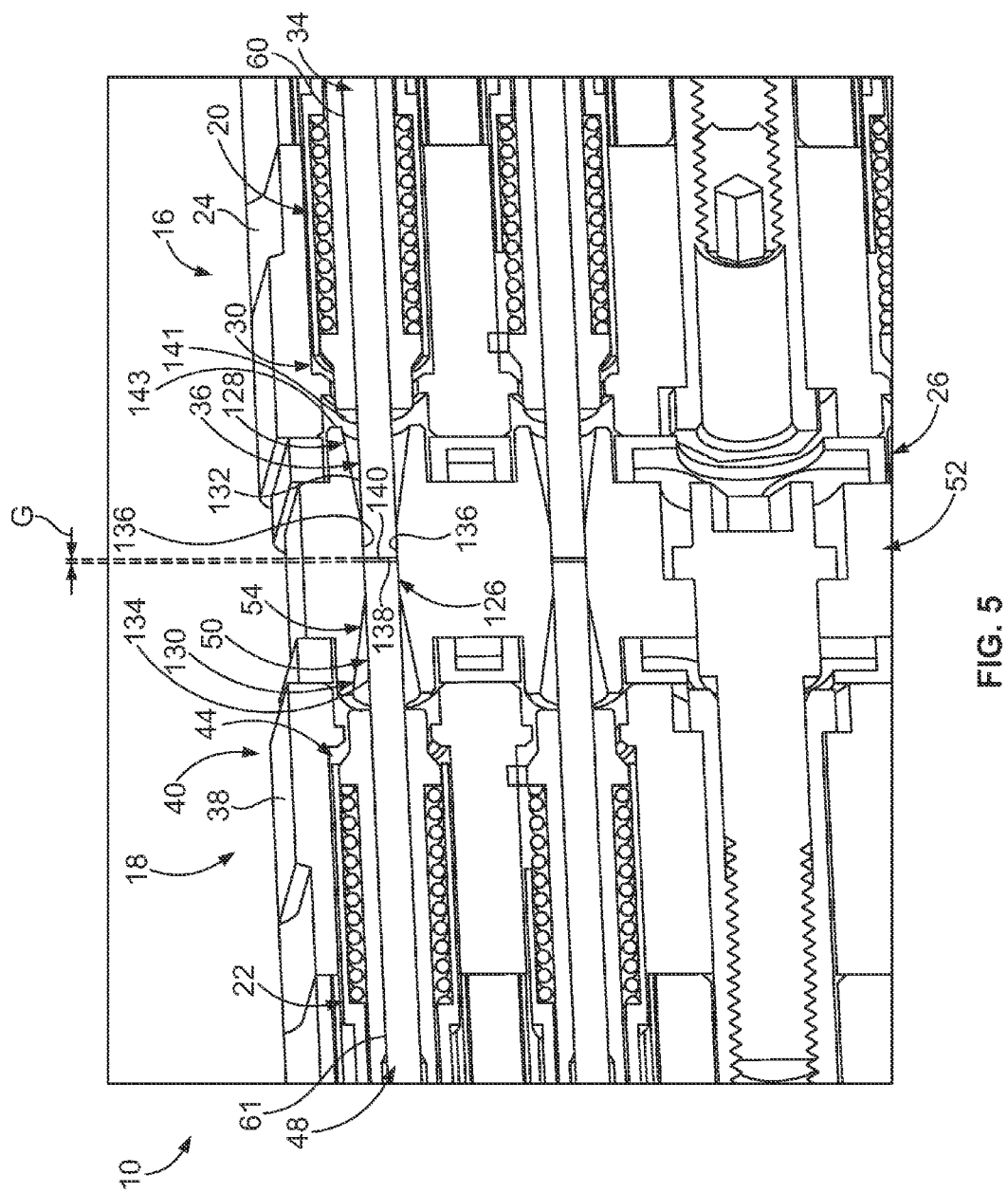
FIG. 5 is a perspective view illustrating an enlarged cross section of a portion of the optical connector system shown in FIGS. 1 and 2.

FIG. 5 is a perspective view illustrating an enlarged cross-sectional view of the optical connector system 10. The terminus assembly 20 shown in FIGS. 3 and 4 is held within the corresponding circuit opening 30 of the connector assembly 16 such that the tip segment 36 of the POF 34 extends outwardly from the connector mating end 26 of the connector housing 24. Similarly, the corresponding terminus assembly 22 is held within the corresponding circuit opening 44 of the connector assembly 18 such that the tip segment 50 of the POF 48 extends outwardly from the connector mating end 40 of the connector housing 38. The POF tip segments 36 and 50 extend into a corresponding mating receptacle 54 of the alignment block 52. The mating receptacle 54 is tapered radially inward to a neck segment 126 of the mating receptacle 54. As the tip segments 36 and 50 are received into the mating receptacle 54, ends 128 and 130 of the mating receptacle 54 that include the taper engage the tip segments 36 and 50, respectively, to radially align the POF tip segments 36 and 50 with respect to each other within the neck segment 126.

The POF tip segments 36 and 50 include radially outer surfaces 132 and 134, respectively. In the exemplary embodiment, the cladding 60 of the POF 34 includes the radially outer surface 132 of the tip segment 36, while a cladding 61 of the POF 48 includes the radially outer surface 134 of the tip segment 50. Within the corresponding mating receptacle 54, the radially outer surfaces 132 and 134 of the POF tip segments 36 and 50, respectively, are engaged with an interior wall 136 of the alignment block 52 that defines the corresponding mating receptacle 54. More specifically, the radially outer surfaces 132 and 134 of the POF tip segments 36 and 50, respectively, engage the interior wall 136 at the neck segment 126 of the corresponding mating receptacle 54. The engagement between the radially outer surfaces 132 and 134 of the POF tip segments 36 and 50, respectively, and the interior wall 136 at the neck segment 126 facilitates radial alignment of the POF tip segments 36 and 50 relative to each other within the corresponding mating receptacle 54.

The POF tip segments 36 and 50 are aligned within the corresponding mating receptacle 54 such that the corresponding tip segments 36 and 50 are optically connected together. The POFs 34 and 48 of the corresponding optical cables 12 and 14, respectively, are thus optically coupled together. In the exemplary embodiment, an air gap G extends between the tip segments 36 and 50 when the tip segments 36 and 50 are optically coupled together within the corresponding mating receptacle 54. More specifically, the air gap G extends between tip surfaces 138 and 140 of the tip segments 36 and 50, respectively, when the tip segments 36 and 50 are optically coupled together within the corresponding mating receptacle 54. The air gap G may be created by a clearance that occurs when a forward surface 141 of the terminus body 68 is biased against a surface 143 of the alignment block 52 by the biasing mechanism 114. The air gap G may have any size that enables the tip segments 36 and 50 to optically couple together within the corresponding mating receptacle 54. The POF tip segments 36 and 50 may have less variation in axial and/or radial alignment than at least some known connector assemblies, which may reduce the amount of attenuation at the optical interface between the POF tip segments 36 and 50.

In some alternative embodiments, the tip surfaces 138 and 140 of the respective tip segments 36 and 50 are engaged (i.e., in physical contact) with each other when the tip segments 36 and 50 are optically coupled together within the corresponding mating receptacle 54. The optical performance at the physical contact interface between the tip segments 36 and 50 may experience less optical attenuation and/or better return loss than at least some known connector assemblies.

The configuration of the alignment block 52, the connector assembly 16, and/or the connector assembly 18 enables the elimination of one or more components. For example, the system 10 does not include alignment sleeves (not shown) held within the mating receptacles 54 of the alignment block 52. Moreover, and for example, the system 10 does not include ferrules (not shown) that extend around the tip segments 36 and 50 of the POFs 34 and 48, respectively. Such alignment sleeves and ferrules are included within at least some known connector assemblies. The elimination of components (such as, but not limited to, the alignment sleeves and ferrules) may increase a reliability of the system 10 and/or any components thereof, and/or may decrease a cost and/or complexity of the system 10 and/or any components thereof. Moreover, the elimination of the ferrules eliminates the need to secure the ferrules to the tip segments 36 and 50 using an epoxy, which may decrease a cost and/or complexity of the system 10 (and/or any components thereof) and/or may reduce an amount of labor and/or time required to fabricate the system 10.

Referring again to FIG. 1, in the exemplary embodiment, the alignment block 52 includes the general shape of a parallelepiped. But, the alignment block 52 may additionally or alternatively include any other shape(s) (such as, but not limited to, cylindrical and/or the like), which may depend on a shape of the connector assemblies 16 and/or 18. Optionally, the alignment block 52 is optically insulative and/or electrically insulative.

Figure 6:
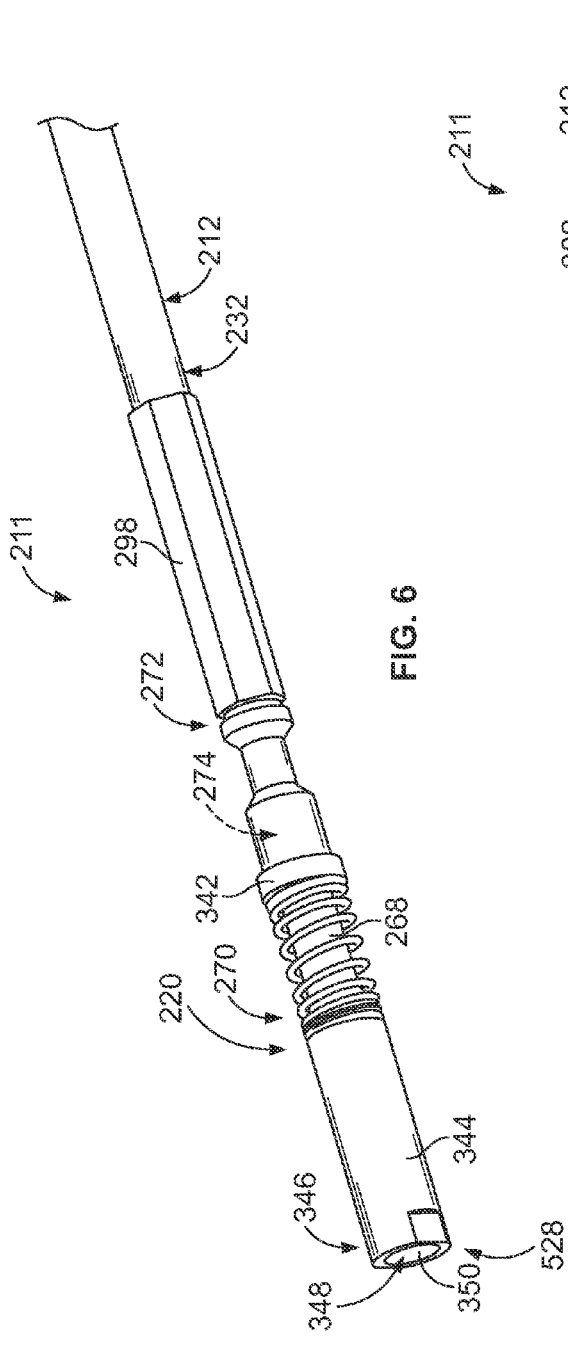
FIG. 6 is a perspective view of an exemplary embodiment of a socket optical cable assembly.
Figure 7:
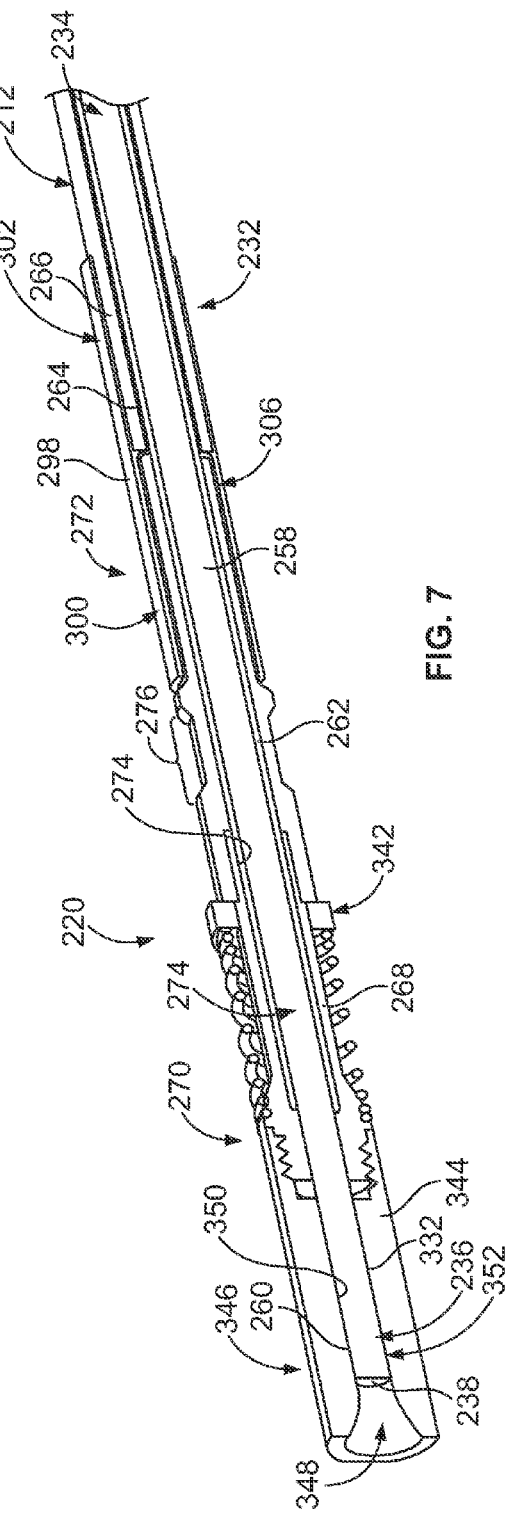
FIG. 7 is a cross-sectional view of the optical cable assembly shown in FIG. 6.
Figure 10:
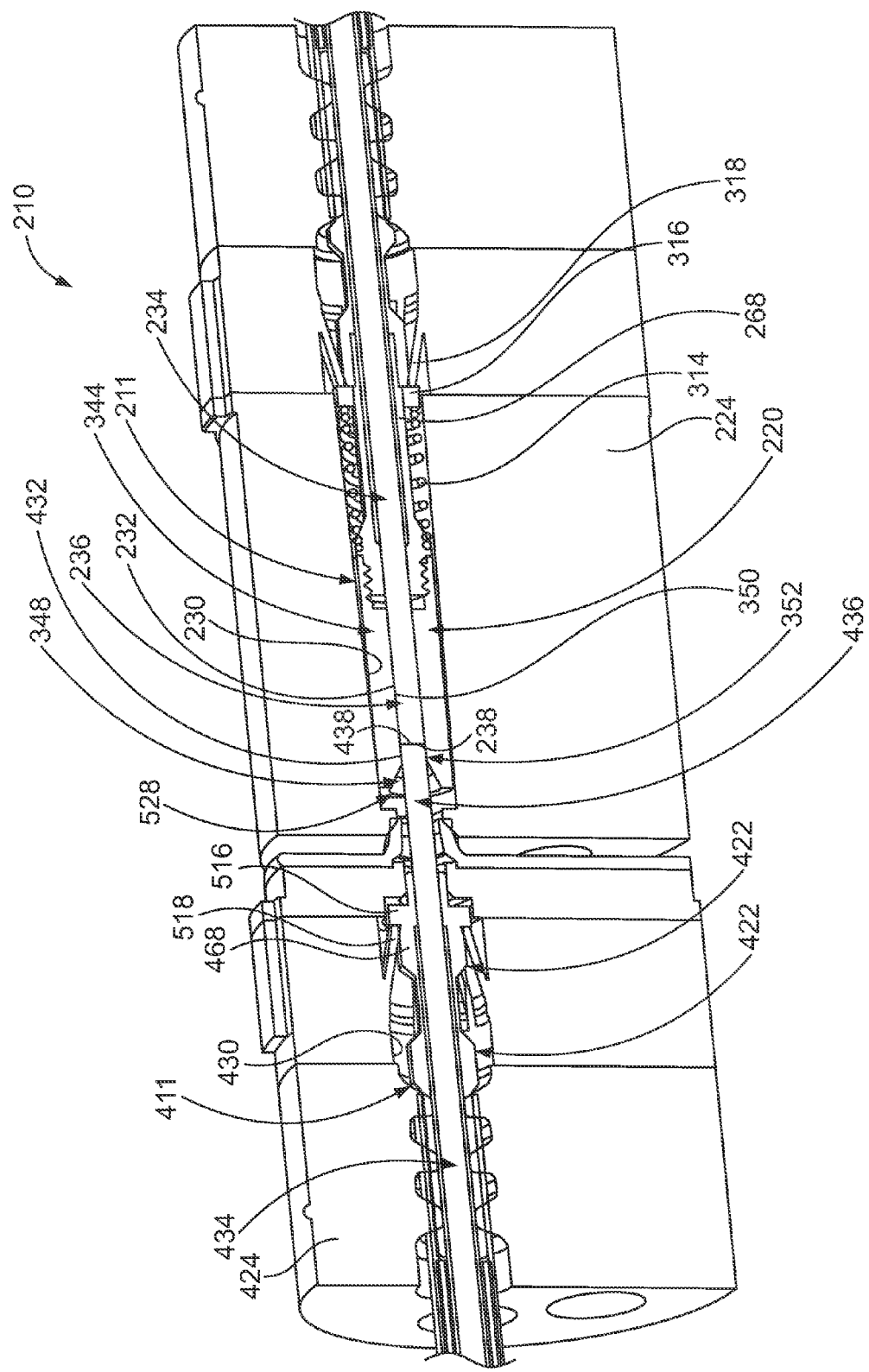
FIG. 10 is a perspective view illustrating an enlarged cross section of an exemplary embodiment of an optical connector system that includes the optical cable assemblies shown in FIGS. 6-10.

FIG. 6 is a perspective view of another exemplary embodiment of an optical cable assembly 211. FIG. 7 is a cross-sectional view of the optical cable assembly 211. The optical cable assembly 211 is a socket optical cable assembly 211 that includes a socket terminus assembly 220 and an optical cable 212. The socket terminus assembly 220 terminates an end 232 of the optical cable 212 and is configured to mate with a pin terminus assembly 422 (FIGS. 8-10). The socket terminus assembly 220 includes a collar 342, a terminus body 268, and a hood 344 that extends from the terminus body 268. The terminus body 268 extends a length from a mating end 270 to a cable end 272. The terminus body 268 includes a cable passage 274 that extends a length through the terminus body 268. At least a portion of a length of an end 232 of the optical cable 212 extends within the cable passage 274.

The hood 344 extends outwardly from the mating end 270 of the terminus body 268 and defines a mating end 346 of the terminus assembly 220. The hood 344 includes an end 528 having a mating receptacle 348 that is configured to receive a tip segment 436 (FIGS. 8-10) of a POF 434 (FIGS. 8-10) of the pin terminus assembly 422 therein, as will be described below. The mating receptacle 348 is defined by an interior wall 350 of the hood 344. The mating receptacle 348 is aligned with the cable passage 274 such that the mating receptacle 348 extends from the cable passage 274. In the exemplary embodiment, the hood 344 is a discrete component from the terminus body 268 that is mounted to the terminus body 268. Alternatively, the hood 344 is integrally formed with the terminus body 268. In the exemplary embodiment, the hood 344 is removably mounted to the terminus body 268 using a threaded connection, but the hood 344 may be additionally or alternatively mounted to the terminus body 268 using any other type of connection (whether or not the hood is removably mounted to the terminus body 268).

Referring now solely to FIG. 7, the optical cable 212 includes a POF 234, which includes a tip segment 236 having a tip surface 238. The POF 234 includes a plastic core 258 and optionally includes a cladding 260 that surrounds the plastic core 258. The plastic core 258 is configured to transmit, or propagate, light (e.g., optical signals) along the length of the POF 234. The POF tip segment 236 includes a radially outer surface 332. In the exemplary embodiment, the cladding 260 of the POF 234 includes the radially outer surface 332.

The optical cable 212 also includes a buffer 262, a strength member 264, and a jacket 266. The buffer 262 surrounds the POF 234 along a portion of the length of the optical cable end 232. The strength member 264 surrounds the buffer 262 along a portion of the length of the end 232 of the optical cable 212. The jacket 266 surrounds the strength member 264 along a portion of the length of the optical cable end 232.

The buffer 262 may be fabricated from any material(s) and may include any structure, such as, but not limited to, polyolefin, another polymer, and/or the like. The strength member 264 and the jacket 266 may each be fabricated from any material(s) and may each include any structure. For example, the strength member 264 may be, but is not limited to being, a yarn, a braid, a sheath, and/or the like. The jacket 266 may be, but is not limited to being, perfluoroalkoxy (PFA), polytetrafluoroethylene (PTFE), another polymer, and/or the like.

The tip segment 236 of the POF 234 extends within the mating receptacle 348 of the hood 344. The tip surface 238 of the POF tip segment 236 is exposed within the mating receptacle 348. The mating receptacle 348 is configured to receive the POF tip segment 436 of the pin terminus assembly 422 (FIGS. 8 and 9) therein such that the tip surface 238 of the POF tip segment 236 engages, and thereby optically couples to, the POF tip segment 436 of the pin terminus assembly 422. Optionally, the tip surface 238 and/or a tip surface 438 (FIGS. 9 and 10) of the POF tip segment 436 is polished. In some embodiments, the hood 344 is removed from the terminus body 268 to enable the tip surface 238 to be polished and/or cleaned while the optical cable 212 is terminated by terminus body 268.

At the mating end 346 of the hood 344, the mating receptacle 348 is tapered radially inward to a neck segment 352 of the mating receptacle 348. As will be described below, the taper of the mating receptacle 348 facilitates radially aligning the POF tip segment 236 of the socket terminus assembly 220 with the POF tip segment 436 of the pin terminus assembly 422 within the mating receptacle 348. Within the mating receptacle 348, the radially outer surface 332 of the POF tip segment 236 is engaged with the interior wall 350 of the hood 344 that defines the mating receptacle 348. More specifically, the radially outer surface 332 of the tip segment 236 of the POF 234 is engaged with the interior wall 350 at the neck segment 352 of the mating receptacle 348. The engagement between the radially outer surface 332 of the POF tip segment 236 and the interior wall 350 at the neck segment 352 facilitates radial alignment of the POF tip segments 236 and 436 relative to each other within the mating receptacle 348.

The terminus body 268 is optionally crimped over, in engagement therewith, the buffer 262 at a crimp zone 276 of the terminus body 268. As can be seen in FIG. 7, the terminus body 268 surrounds the buffer 262 of the optical cable 212 at the crimp zone 276. Any type of crimp having any structure may be used, such as, but not limited to, a hexagonal crimp, a ⅘ indent crimp, a circular crimp, a triangular crimp, a crimp formed by opposing and parallel jaws, and/or the like.

The strength member 264 of the optical cable 212 includes a member segment 306 that extends over at least a portion of the cable end 272 of the terminus body 268. The socket terminus assembly 220 includes a crimp sleeve 298 that extends a length that includes a (crimp sleeve) terminus segment 300 and a cable segment 302. The crimp sleeve 298 can also be seen in FIG. 6. The crimp sleeve 298 extends around the cable end 272 of the terminus body 268 and around the portion of the optical cable end 232 that extends outwardly from the cable end 272. The terminus segment 300 of the crimp sleeve 298 surrounds the cable end 272 of the terminus body 268 and the member segment 306 of the strength member 264 that extends over the cable end 272. The cable segment 302 of the crimp sleeve 298 surrounds the portion of the optical cable end 232 that extends outwardly from the cable end 272 of the terminus body 268 such the cable segment 302 surrounds the jacket 266 of the optical cable 212.

As shown in FIG. 7, the crimp sleeve 298 is crimped over the cable end 272 of the terminus body 268 and the member segment 306 of the strength member 264 that extends over the cable end 272. More specifically, the terminus segment 300 of the crimp sleeve 298 is crimped over the cable end 272 and the member segment 306. When crimped over the cable end 272 and the member segment 306, the terminus segment 300 of the crimp sleeve 298 is engaged with the member segment 306 of the strength member 264. The crimp between the crimp sleeve 298 and the member segment 306 of the strength member 264 mechanically connects the cable end 272 of the terminus body 268 to the member segment 306 and mechanically connects the member segment 306 to the terminus segment 300 of the crimp sleeve 298. The crimp between the crimp sleeve 298 and the member segment 306 thereby mechanically connects the cable end 272 of the terminus body 268 to the optical cable 212. Any type of crimp having any structure may be used, such as, but not limited to, a hexagonal crimp, a ⅘ indent crimp, a circular crimp, a triangular crimp, a crimp formed by opposing and parallel jaws, and/or the like.

The crimp sleeve 298 is also crimped over the portion of the optical cable end 232 that extends outwardly from the cable end 272 of the terminus body 268, as shown in FIG. 7. More specifically, the cable segment 302 of the crimp sleeve 298 is crimped over the portion of the optical cable end 232 that extends outwardly from the cable end 272 of the terminus body 268. When crimped over the portion of the optical cable end 232 that extends outwardly from the cable end 272, the crimp sleeve 298 is engaged with the jacket 266 of the optical cable 212. The crimp sleeve 298 is thus engaged with the jacket 266 at the cable segment 302. The crimp between the crimp sleeve 298 and the jacket 266 mechanically connects the jacket 266 to the cable segment 302 of the crimp sleeve 298. Accordingly, the crimp between the crimp sleeve 298 and the jacket 266 mechanically connects the cable segment 302 of the crimp sleeve 298 to the optical cable 212. Any type of crimp having any structure may be used, such as, but not limited to, a hexagonal crimp, a ⅘ indent crimp, a circular crimp, a triangular crimp, a crimp formed by opposing and parallel jaws, and/or the like.

FIG. 8 is a perspective view of an exemplary embodiment of a pin optical cable assembly 411 that is configured to mate with the socket optical cable assembly 211. FIG. 9 is a cross-sectional view of the pin optical cable assembly 411. The pin optical cable assembly 411 includes the pin terminus assembly 422 and an optical cable 412. The pin terminus assembly 422 terminates an end 446 of the optical cable 412 and is configured to mate with the socket terminus assembly 220 (FIGS. 6, 7, and 10). The pin terminus assembly 422 includes a terminus body 468 that extends a length from a mating end 470 to a cable end 472. The terminus body 468 includes a cable passage 474 that extends a length through the terminus body 468. At least a portion of a length of the end 446 of the optical cable 412 extends within the cable passage 474.

Referring now solely to FIG. 9, the optical cable 412 includes a POF 434, which includes the tip segment 436 having the tip surface 438. The tip segment 436 of the POF 434 extends outwardly from the mating end 470 of the terminus body 468. The tip segment 436 is configured to be received within the mating receptacle 348 (FIGS. 6, 7, and 10) of the socket terminus assembly 220. Optionally, the tip surface 438 is polished.

The POF 434 includes a plastic core 458 and optionally includes a cladding 460 that surrounds the plastic core 458. The plastic core 458 is configured to transmit, or propagate, light (e.g., optical signals) along the length of the POF 434. The POF tip segment 436 includes a radially outer surface 432. In the exemplary embodiment, the cladding 460 of the POF 434 includes the radially outer surface 432.

The optical cable 412 also includes a buffer 462, a strength member 464, and a jacket 466. The buffer 462 surrounds the POF 434 along a portion of the length of the optical cable end 446. The strength member 464 surrounds the buffer 462 along a portion of the length of the end 446 of the optical cable 412. The jacket 466 surrounds the strength member 464 along a portion of the length of the optical cable end 446.

The buffer 462 may be fabricated from any material(s) and may include any structure, such as, but not limited to, polyolefin, another polymer, and/or the like. The strength member 464 and the jacket 466 may each be fabricated from any material(s) and may each include any structure. For example, the strength member 464 may be, but is not limited to being, a yarn, a braid, a sheath, and/or the like. The jacket 466 may be, but is not limited to being, perfluoroalkoxy (PFA), polytetrafluoroethylene (PTFE), another polymer, and/or the like.

The terminus body 468 is optionally crimped over, in engagement therewith, the buffer 462 at a crimp zone 476 of the terminus body 468. As can be seen in FIG. 9, the terminus body 468 surrounds the buffer 462 of the optical cable 412 at the crimp zone 476. Any type of crimp having any structure may be used, such as, but not limited to, a hexagonal crimp, a ⅘ indent crimp, a circular crimp, a triangular crimp, a crimp formed by opposing and parallel jaws, and/or the like.

The strength member 464 of the optical cable 412 includes a member segment 506 that extends over at least a portion of the cable end 472 of the terminus body 468. The pin terminus assembly 422 includes a crimp sleeve 498 that extends a length that includes a (crimp sleeve) terminus segment 500 and a cable segment 502. The crimp sleeve 498 can also be seen in FIG. 8. The crimp sleeve 498 extends around the cable end 472 of the terminus body 468 and around the portion of the optical cable end 446 that extends outwardly from the cable end 472. More specifically, the terminus segment 500 of the crimp sleeve 498 surrounds the cable end 472 of the terminus body 468 and the member segment 506 of the strength member 464 that extends over the cable end 472. The cable segment 502 of the crimp sleeve 498 surrounds the portion of the optical cable end 446 that extends outwardly from the cable end 472 of the terminus body 468 such the cable segment 502 surrounds the jacket 466 of the optical cable 412.

As shown in FIG. 9, the crimp sleeve 498 is crimped over the cable end 472 of the terminus body 468 and the member segment 506 of the strength member 464 that extends over the cable end 472. More specifically, the terminus segment 500 of the crimp sleeve 498 is crimped over the cable end 472 and the member segment 506. When crimped over the cable end 472 and the member segment 506, the terminus segment 500 of the crimp sleeve 498 is engaged with the member segment 506 of the strength member 464. The crimp between the crimp sleeve 498 and the member segment 506 of the strength member 464 mechanically connects the cable end 472 of the terminus body 468 to the member segment 506 and mechanically connects the member segment 506 to the terminus segment 500 of the crimp sleeve 498. The crimp between the crimp sleeve 498 and the member segment 506 thereby mechanically connects the cable end 472 of the terminus body 468 to the optical cable 412. Any type of crimp having any structure may be used, such as, but not limited to, a hexagonal crimp, a ⅘ indent crimp, a circular crimp, a triangular crimp, a crimp formed by opposing and parallel jaws, and/or the like.

The crimp sleeve 498 is also crimped over the portion of the optical cable end 446 that extends outwardly from the cable end 472 of the terminus body 468, as is shown in FIG. 9. More specifically, the cable segment 502 of the crimp sleeve 498 is crimped over the portion of the optical cable end 446 that extends outwardly from the cable end 472 of the terminus body 468. When crimped over the portion of the optical cable end 446 that extends outwardly from the cable end 472, the crimp sleeve 498 is engaged with the jacket 466 of the optical cable 412. The crimp sleeve 498 is thus engaged with the jacket 466 at the cable segment 502. The crimp between the crimp sleeve 498 and the jacket 466 mechanically connects the jacket 466 to the cable segment 502 of the crimp sleeve 498. Accordingly, the crimp between the crimp sleeve 498 and the jacket 466 mechanically connects the cable segment 502 of the crimp sleeve 498 to the optical cable 412. Any type of crimp having any structure may be used, such as, but not limited to, a hexagonal crimp, a ⅘ indent crimp, a circular crimp, a triangular crimp, a crimp formed by opposing and parallel jaws, and/or the like.

FIG. 10 is a perspective view illustrating an enlarged cross section of an optical connector system 210 that includes the socket and pin optical cable assemblies 211 and 411, respectively. FIG. 10 illustrates the socket and pin optical cable assemblies 211 and 411, respectively, as mated together. The socket terminus assembly 220 is held within a corresponding circuit opening 230 of a connector housing 224 of the system 210. A lock shoulder 316 of the collar 342 is engaged with a lock feature 318 of the connector housing 224 to secure the socket terminus assembly 220 within the corresponding circuit opening 230. The pin terminus assembly 422 is held within a corresponding circuit opening 430 of a connector housing 424 of the system 210. A lock shoulder 516 of the terminus body 468 is engaged with a lock feature 518 of the connector housing 424 to secure the pin terminus assembly 422 within the corresponding circuit opening 430.

When the socket terminus assembly 220 and the pin terminus assembly 422 are mated together, the POF tip segment 436 of the pin terminus assembly 422 is received into the mating receptacle 348 of the socket terminus assembly 220. As the tip segment 436 of the pin terminus assembly 422 is received into the mating receptacle 348 of the socket terminus assembly 220, an end 528 of the mating receptacle 348 that includes the taper engages the tip segment 436 to radially align the tip segment 436 with the tip segment 236 of the socket terminus assembly 220 within the neck segment 352 of the mating receptacle 348. Within the neck segment 352 of the mating receptacle 348, the radially outer surfaces 232 and 432 of the tip segments 236 and 436, respectively, are engaged with the interior wall 350 of the hood 344 that defines the mating receptacle 348. The engagement between the radially outer surfaces 232 and 434 and the interior wall 350 at the neck segment 352 facilitates radial alignment of the POF tip segments 236 and 436 relative to each other within the mating receptacle 348.

The POF tip segments 236 and 436 are aligned within the mating receptacle 348 such that the tip segments 236 and 436 are optically connected together. The POFs 234 and 434 of the optical cables 212 and 412, respectively, are thus optically coupled together. In the exemplary embodiment, and as shown in FIG. 10, the tip surfaces 238 and 438 of the respective tip segments 236 and 436 are engaged (i.e., in physical contact) with each other to optically couple the tip segments 236 and 436 together within the mating receptacle 348. A biasing mechanism 314 may be used to provide a biasing force that biases the tip surface 238 of the POF tip segment 236 into engagement with the tip surface 438 of the POF tip segment 436. In the exemplary embodiment, the biasing mechanism 314 is a coil spring, but the biasing mechanism 314 may additionally or alternatively include any other type of biasing mechanism. The POF tip segments 236 and 436 may have less variation in axial and/or radial alignment than at least some known connector assemblies, which may reduce the amount of attenuation at the optical interface between the POF tip segments 236 and 436. The optical performance at the physical contact interface between the tip surfaces 238 and 438 may experience less optical attenuation and/or better return loss than at least some known connector assemblies.

The configuration of the socket terminus assembly 220 and/or the pin terminus assembly 422 enables the elimination of one or more components. For example, the socket terminus assembly 220 does not include an alignment sleeve (not shown) held within the mating receptacle 348 of the hood 344. Moreover, and for example, the socket terminus assembly 220 and the pin terminus assembly 422 do not include ferrules (not shown) that extend around the respective tip segments 236 and 436 of the POFs 234 and 434, respectively. Moreover, the connector housings 224 and 424 do not mate together with an alignment block therebetween. The elimination of components (such as, but not limited to, the alignment sleeves, an alignment block, and/or the ferrules) may increase a reliability of the system 210 and/or any components thereof, and/or may decrease a cost and/or complexity of the system 210 and/or any components thereof. Moreover, the elimination of the ferrules eliminates the need to secure the ferrules to the tip segments 236 and 436 using an epoxy, which may decrease a cost and/or complexity of the system 210 (and/or any components thereof) and/or may reduce an amount of labor and/or time required to fabricate the system 210.

Although the system 210 is shown in FIG. 10 as only including a single socket optical cable assembly 211 and a single pin optical cable assembly 411, the system 210 may include any number of the socket optical cable assemblies 211 and any number of the pin optical cable assemblies 411.

Figure 11:
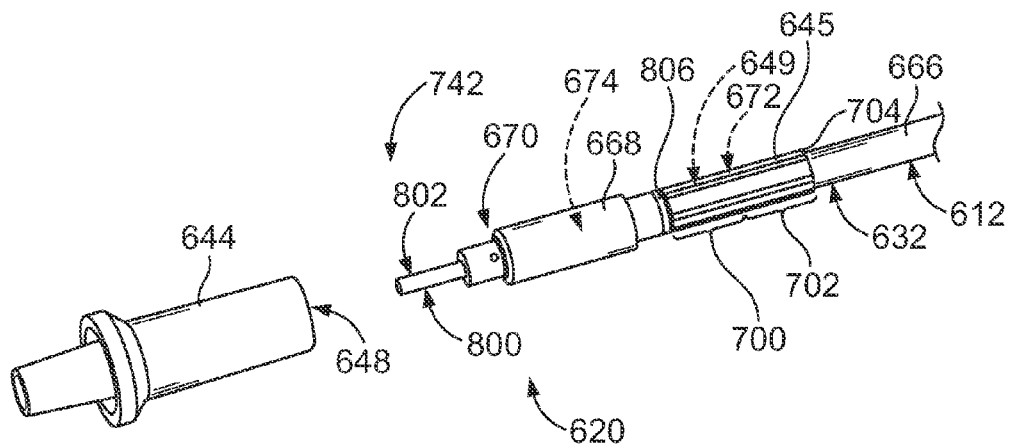
FIG. 11 is a partially exploded perspective view of an exemplary embodiment of an optical cable assembly with a protective cap.
Figure 13:
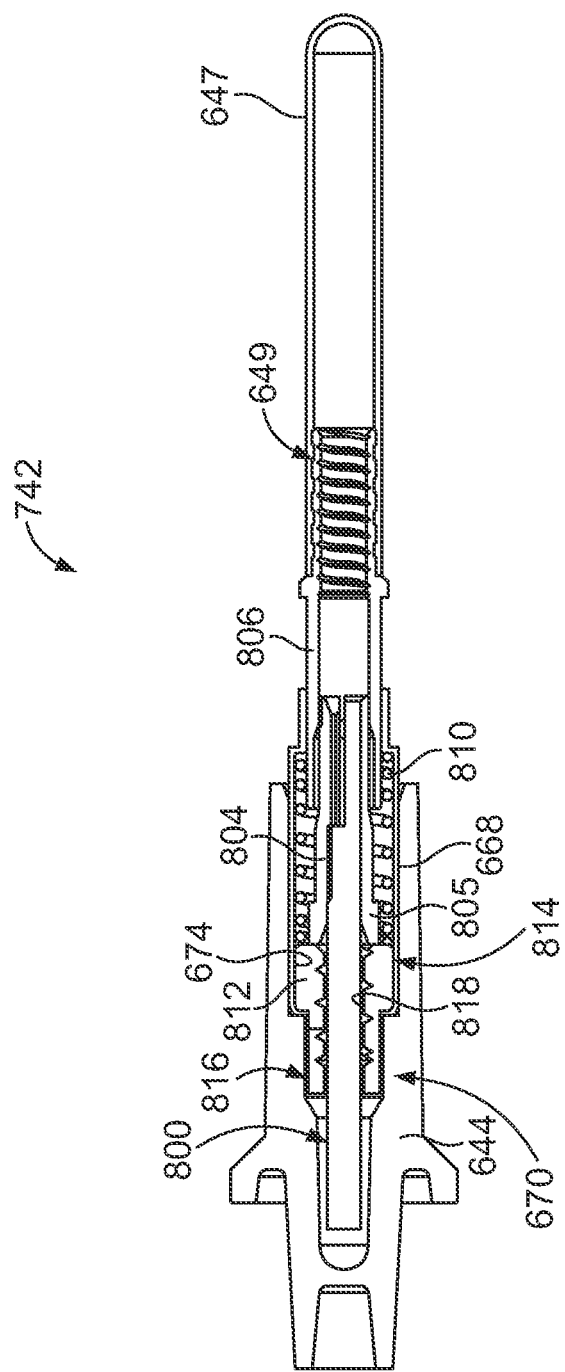
FIG. 13 is a cross-sectional view of the terminus assembly shown in FIG. 12, with protective caps.
Figure 14:
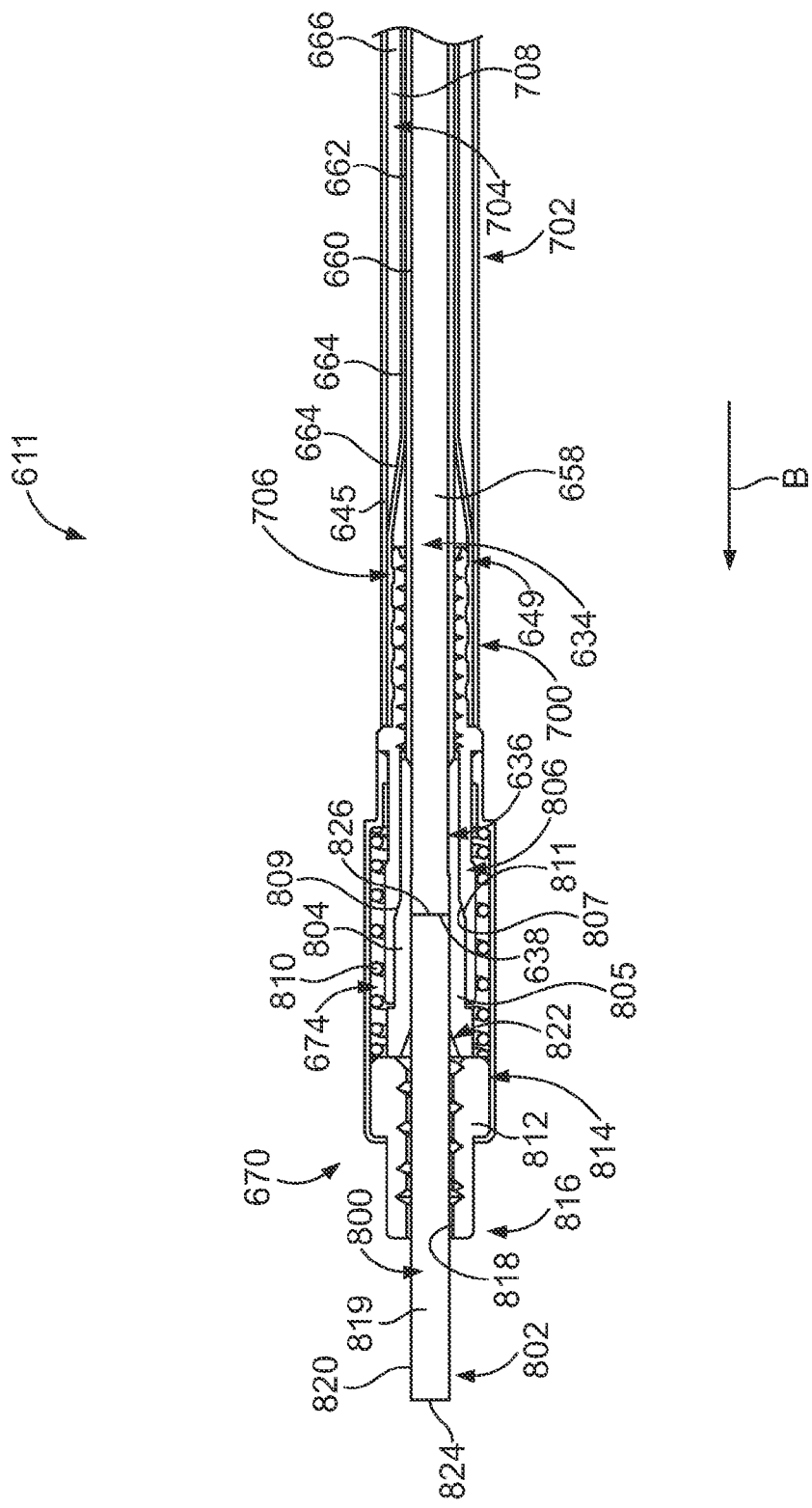
FIG. 14 is a cross-sectional view of the optical cable assembly shown in FIG. 11.

FIG. 11 is a partially exploded perspective view of another exemplary embodiment of an optical cable assembly 611. The optical cable assembly 611 includes a terminus kit 620 and an optical cable 612 that is terminated thereby. The optical cable 612 includes an end 632 and a POF 634 (FIG. 14). The terminus kit 620 includes a terminus assembly 742 that includes a shell 668 and a cover 644 that extends from the shell 668. The terminus kit 620 also includes a crimp sleeve 645 and a protective end cap 647 (FIG. 13).

The terminus assembly 742 extends a length from a mating end 670 to a cable end 672. The shell 668 includes a cable passage 674 that extends lengthwise through the shell 668. At least a portion of a length of the end 632 of the optical cable 612 extends within the cable passage 674.

As will be described below, the terminus assembly 742 contains and holds a POF stub 800. The POF stub 800 is optically coupled to a tip segment 636 (FIG. 13) of the POF 634 within the terminus assembly 742. The POF stub 800 includes a mating end 802 at which the POF stub 800 is configured to mate with a mating POF (e.g., the POFs 34 and/or 48 shown and/or described herein) of a mating connector (e.g., the terminus assemblies 20 and/or 22 shown and/or described herein). In the exemplary embodiment, the mating end 802 of the POF stub 800 is configured to extend within a receptacle 648 of the cover 644 such that the cover 644 extends around the mating end 802 of the POF stub 800. The cover 644 is used to protect the mating end 802 of the POF stub 800 (e.g., a polished mating surface 824) before the terminus kit 620 is installed into a corresponding connector housing 724 (FIG. 14). In other words, and as is apparent in FIG. 14, the cover 644 is removed before the optical cable assembly 611 is installed into the corresponding connector housing 724.

Figure 12:
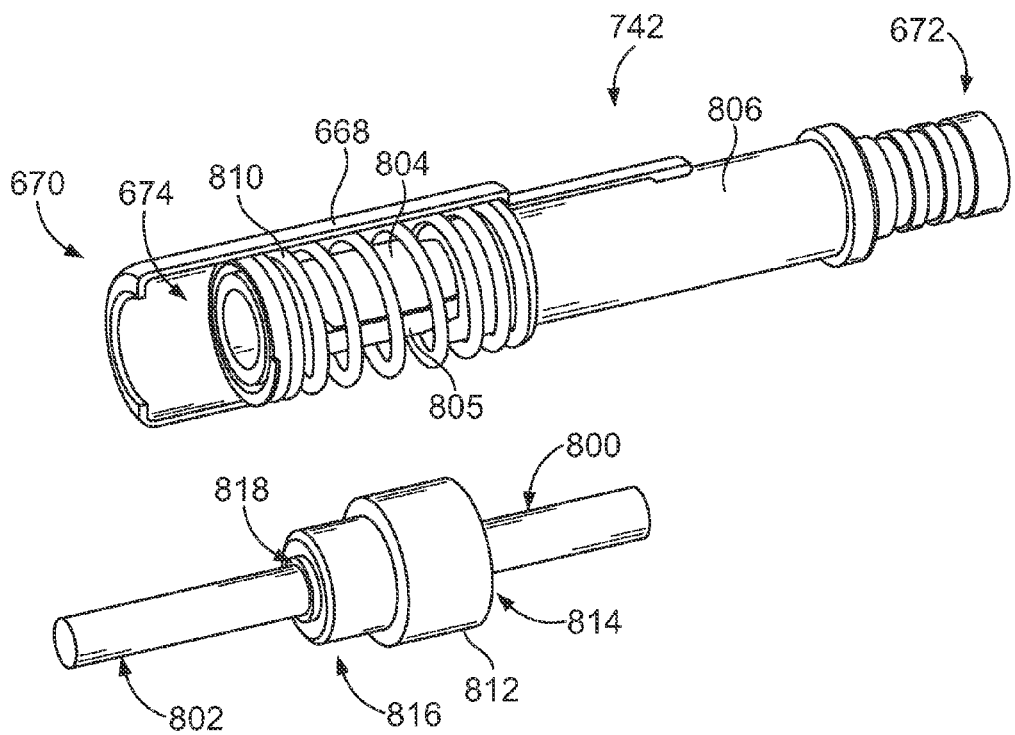
FIG. 12 is a partially exploded perspective view of an exemplary embodiment of a terminus assembly contained in the optical cable assembly shown in FIG. 11.

FIG. 12 is a partially exploded perspective view of an exemplary embodiment of the terminus assembly 742. FIG. 13 is a cross-sectional view of the terminus assembly 742 with the cover 644 and the end cap 647 installed. FIG. 14 is a cross-sectional view of the optical cable assembly 611. Referring now to FIGS. 12-14, the terminus assembly 742 includes the shell 668, a wedge 804, a clamp block 805, a plunger 806, a biasing mechanism 810, and a stub carrier 812. The stub carrier 812 is held within the cable passage 674 of the shell 668 at the mating end 670 of the shell 668. More specifically, a (stub carrier) shell end 814 of the stub carrier 812 is held within the cable passage 674, as is best seen in FIG. 14. The stub carrier 812 also includes a mating end 816 that is opposite the shell end 814. The stub carrier 812 includes a passage 818 that receives the POF stub 800. The cover 644 of the terminus assembly 742 is not shown in FIG. 12 for clarity. The wedge 804, the clamp block 805, the plunger 806, and the biasing mechanism 810 are each at least partially within the cable passage 674 of the shell 668. The wedge 804, the clamp block 805, and the plunger 806 cooperate to facilitate termination of the optical cable 612 to the terminus assembly 742.

Referring now solely to FIG. 14, the POF stub 800 includes a plastic core 819 and optionally includes a cladding 820 that surrounds the plastic core 819. The plastic core 819 is configured to transmit, or propagate, light (e.g., optical signals) along the length of the POF stub 800. The POF 634 includes a plastic core 658 and optionally includes a cladding 660 that surrounds the plastic core 658. The plastic core 658 is configured to transmit, or propagate, light (e.g., optical signals) along the length of the POF 634. The tip segment 636 of the POF 634 includes a tip surface 638. The optical cable 612 includes a buffer 662, a strength member 664, and a jacket 666. The buffer 662 surrounds the POF 634 along a portion of the length of the optical cable end 632. The strength member 664 surrounds the buffer 662 along a portion of the length of the end 632 of the optical cable 612. The jacket 666 surrounds the strength member 664 along a portion of the length of the optical cable end 632.

As can be seen in FIG. 14, the tip segment 636 of the POF 634 extends within the cable passage 674 of the shell 668. The POF stub 800 extends a length from the mating end 802 to a fiber end 822. The mating end 802 includes a mating surface 824, while the fiber end 822 includes a coupling surface 826. Optionally, the mating surface 824 and/or the coupling surface 826 is polished. Factory polishing of the mating surface 824 and/or the coupling surface 826 may save time and/or work for a customer and/or may improve control of polishing consistency for better optical performance. The POF stub 800 extends through the passage 818 of the stub carrier 812 such that the stub carrier 812 supports the POF stub 800. The POF stub 800 is held by the stub carrier 812, and the stub carrier 812 is held by the shell 668, such that the fiber end 822 of the POF stub 800 extends within the cable passage 674. Optionally, the POF stub 800 is bonded to the stub carrier 812 using an adhesive. For example, the cladding 820 of the POF stub 800 may be bonded to the stub carrier 812 using an adhesive.

As described above, the wedge 804, the clamp block 805, and the plunger 806 cooperate to facilitate termination of the optical cable 612 to the terminus assembly 742. The plunger 806 is shown in a staged position (e.g., as shipped to a customer) in FIG. 13 and an actuated position in FIG. 14. In the staged position shown in FIG. 13, the end cap 647 is installed on a cable end 649 of the plunger 806, for example for protecting the gel described below from contamination. As should be apparent from a comparison of FIGS. 13 and 14, the plunger 806 is actuated by moving (e.g., using a specialized tool) the plunger 806 in the direction of the arrow B from the staged position shown in FIG. 13 to the actuated position shown in FIG. 14. As the plunger 806 moves toward the actuated position, a ramp 807 of the plunger 806 engages ramps 809 and 811 of the wedge 804 and the clamp block 805, respectively, which creates an interference fit between the plunger 806 and the wedge 804 and clamp block 805. The interference fit compresses the wedge 804 and clamp block 805 radially inward toward each other, which exerts a gripping force on the fiber end 822 of the POF stub 800 and the tip segment 636 of the POF 634 that holds the POF stub 800 and the POF 634 within the cable passage 674. The wedge 804, the clamp block 805, and the plunger 806 thereby facilitate aligning, mechanically securing, and optically coupling the POF stub 800 and the POF 634 together.

When the plunger 806 is in the actuated position as shown in FIG. 14, the coupling surface 826 of the fiber end 822 of the POF stub 800 is aligned with the tip surface 638 of the tip segment 636 of the POF 634 within the cable passage 674 such that the POF stub 800 and the POF 634 are optically coupled together. In the exemplary embodiment, and as shown in FIG. 14, the coupling surface 826 of the POF stub 800 and the tip surface 638 of the POF 634 are engaged with each other to optically couple the POF 634 and the POF stub 800 together. Optionally, a gel (not shown) is provided that extends between, in engagement therewith, the coupling surface 826 and the tip surface 638 to enhance the optical coupling between the POF 634 to the POF stub 800. The coupling surface 826 and the tip surface 638 are optionally permanently connected together.

Referring now to FIGS. 11 and 14, the crimp sleeve 645 extends a length that includes a terminus segment 700 and a cable segment 702. The crimp sleeve 645 includes a central passage 704 that extends through the length of the crimp sleeve 645. The strength member 664 (not visible in FIG. 11) of the optical cable 612 includes a member segment 706 (not visible in FIG. 11) that extends over at least a portion of the cable end 649 of the plunger 806. The crimp sleeve 645 extends around the cable end 649 of the plunger 806 and around the portion of the optical cable end 632 that extends outwardly from the plunger cable end 649. The plunger cable end 649 and the member segment 706 of the strength member 664 that extends over the plunger cable end 649 are received within the central passage 704 of the crimp sleeve 645 along the terminus segment 700 of the crimp sleeve 645. The portion of the optical cable end 632 that extends outwardly from the cable end 649 of the plunger 806 is received within the central passage 704 of the crimp sleeve along the cable segment 702 such the cable segment 702 surrounds the jacket 666 of the optical cable 612.

The crimp sleeve 645 is crimped over the cable end 649 of the plunger 806 and the member segment 706 of the strength member 664 that extends over the cable end 649. More specifically, the terminus segment 700 of the crimp sleeve 645 is crimped over the plunger cable end 649 and the member segment 706. When crimped over the plunger cable end 649 and the member segment 706, an interior surface 708 (not visible in FIG. 11) of the crimp sleeve 645 is engaged with the member segment 706 of the strength member 664. Accordingly, the crimp sleeve 645 is engaged with the member segment 706 of the strength member 664 at the terminus segment 700 of the crimp sleeve 645. The crimp between the crimp sleeve 645 and the member segment 706 of the strength member 664 mechanically connects the cable end 649 of the plunger 806 to the member segment 706 of the strength member 664 and mechanically connects the member segment 706 to the terminus segment 700 of the crimp sleeve 645. The crimp between the crimp sleeve 645 and the member segment 706 thereby mechanically connects the cable end 649 of the plunger 806 to the optical cable 612. Any type of crimp having any structure may be used, such as, but not limited to, a hexagonal crimp, a ⅘ indent crimp, a circular crimp, a triangular crimp, a crimp formed by opposing and parallel jaws, and/or the like.

The crimp sleeve 645 is also crimped over the portion of the optical cable end 632 that extends outwardly from the cable end 649 of the plunger 806. More specifically, the cable segment 702 of the crimp sleeve 645 is crimped over the portion of the optical cable end 632 that extends outwardly from the plunger cable end 649. When crimped over the portion of the optical cable end 632 that extends outwardly from the plunger cable end 649, the interior surface 708 of the crimp sleeve 645 is engaged with the jacket 666 of the optical cable 612. The crimp sleeve 645 is thus engaged with the jacket 666 at the cable segment 702. The crimp between the crimp sleeve 645 and the jacket 666 of the optical cable 612 mechanically connects the jacket 666 to the cable segment 702 of the crimp sleeve 645. Accordingly, the crimp between the crimp sleeve 645 and the jacket 666 mechanically connects the cable segment 702 of the crimp sleeve 645 to the optical cable 612. Any type of crimp having any structure may be used, such as, but not limited to, a hexagonal crimp, a ⅘ indent crimp, a circular crimp, a triangular crimp, a crimp formed by opposing and parallel jaws, and/or the like.

The configuration of the terminus assembly 742 and/or the POF stub 800 enables the elimination of one or more components. For example, the terminus assembly 742 does not include a ferrule (not shown) that extends around the mating end 802 of the POF stub 800. The elimination of components (such as, but not limited to, the ferrule) may increase a reliability of the system 10 and/or any components thereof, and/or may decrease a cost and/or complexity of the system 10 and/or any components thereof. Moreover, the elimination of the ferrules eliminates the need to secure the ferrules to the mating end 802 of the POF stub 800 using an epoxy, which may decrease a cost and/or complexity of the system 610 (and/or any components thereof) and/or may reduce an amount of labor and/or time required to fabricate the system 610.

The optical cable assembly 611 may be incorporated into a larger system (e.g., the system 610 described below with reference to FIG. 15) for more than two optical cables or may be used to individually optically couple two optical cables together.

Figure 15:
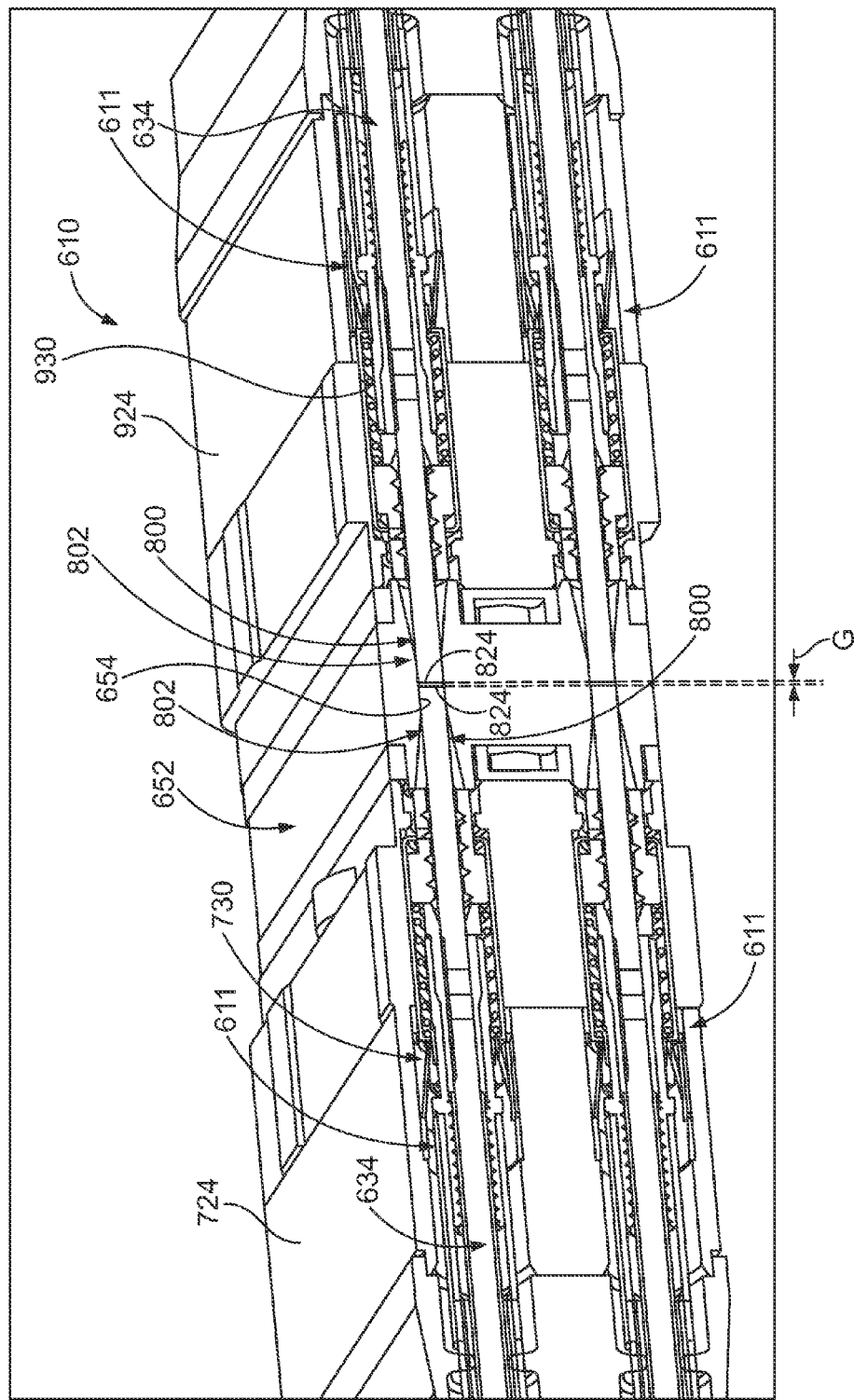
FIG. 15 is a perspective view illustrating a cross section of another exemplary embodiment of an optical connector system containing the optical cable assembly shown in FIGS. 11 and 14.

FIG. 15 is a perspective view illustrating a cross-section of another exemplary embodiment of an optical connector system 610. The optical connector system 610 includes the connector housing 724, a connector housing 924, a plurality of the optical cable assemblies 611, and an alignment block 652. Each optical cable assembly 611 is held within a corresponding circuit opening 730 or 930 of a corresponding connector housing 724 or 924. The mating ends 802 of corresponding POF stubs 800 extend within a corresponding mating receptacle 654 of the alignment block 652.

The corresponding POF stubs 800 are aligned within the corresponding mating receptacle 654 such that the corresponding mating surfaces 824 are optically connected together. The POFs 634 of corresponding optical cables 612 are thus optically coupled together. In the exemplary embodiment, an air gap G extends between the mating surfaces 824 of corresponding POF stubs 800 when the corresponding POF stubs 800 are optically coupled together within the corresponding mating receptacle 654. The air gap G may have any size that enables the mating surfaces 824 of corresponding POF stubs 800 to optically couple together within the corresponding mating receptacle 654. The corresponding POF stubs 800 may have less variation in axial and/or radial alignment than at least some known connector assemblies, which may reduce the amount of attenuation at the optical interface between the corresponding POF stubs 800.

In some alternative embodiments, the mating surfaces 824 of corresponding POF stubs 800 are engaged (i.e., in physical contact) with each other when the corresponding POF stubs 800 are optically coupled together within the corresponding mating receptacle 654. The optical performance at the physical contact interface between the corresponding POF stubs 800 may experience less optical attenuation and/or better return loss than at least some known connector assemblies.

The configuration of the alignment block 652, the optical cable assemblies 611, and/or the connector housings 724 and/or 924 enables the elimination of one or more components. For example, the system 610 does not include alignment sleeves (not shown) held within the mating receptacles 654 of the alignment block 652. Moreover, and for example, the system 610 does not include ferrules (not shown) that extend around the mating ends 802 of the POF stubs 800. Such alignment sleeves and ferrules are included within at least some known connector assemblies. The elimination of components (such as, but not limited to, the alignment sleeves and ferrules) may increase a reliability of the system 610 and/or any components thereof, and/or may decrease a cost and/or complexity of the system 610 and/or any components thereof. Moreover, the elimination of the ferrules eliminates the need to secure the ferrules to the mating ends 802 of the POF stubs 800 using an epoxy, which may decrease a cost and/or complexity of the system 610 (and/or any components thereof) and/or may reduce an amount of labor and/or time required to fabricate the system 610

In the exemplary embodiment, the alignment block 652 includes the general shape of a parallelepiped. But, the alignment block 652 may additionally or alternatively include any other shape(s) (such as, but not limited to, cylindrical and/or the like), which may depend on a shape of the terminus kits 620. Optionally, the alignment block 652 is optically insulative and/or electrically insulative.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. An optical cable assembly comprising:
an optical cable having an end, the optical cable including a plastic optical fiber (POF) having a tip segment that includes a tip surface, the optical cable including a buffer surrounding the POF along a portion of the end of the optical cable; and
a socket terminus assembly terminating the end of the optical cable and being configured to mate with a pin terminus assembly, the socket terminus assembly comprising a terminus body having a cable passage and a crimp zone, at least a portion of the end of the optical cable extending within the cable passage such that the tip surface of the tip segment of the POF is configured to engage a mating POF of the pin terminus assembly to optically couple the POF to the mating POF, and wherein at least a portion of the end of the optical cable extends within the cable passage of the terminus body such that the terminus body surrounds the buffer of the optical cable at the crimp zone, wherein the terminus body is crimped over, in engagement with, the buffer of the optical cable at the crimp zone.

2. The optical cable assembly of claim 1, wherein the socket terminus assembly comprises a hood having a mating receptacle that extends from the cable passage of the terminus body, the tip segment of the POF extending within the mating receptacle such that the tip surface of the POF is exposed within the mating receptacle, the mating receptacle being configured to receive the mating POF therein such that the tip surface of the POF is engaged with the mating POF.

3. The optical cable assembly of claim 1, wherein the assembly does not include a ferrule that extends around the tip segment of the POF.

4. The optical cable assembly of claim 1, wherein the optical cable includes a jacket surrounding the buffer along a portion of the end of the optical cable, at least a portion of the jacket is removed to expose the buffer such that an interior surface of the terminus body at the crimp zone engages and partially compresses the buffer when the terminus body is crimped over the buffer.

5. The optical cable assembly of claim 1, wherein the terminus body is crimped over the buffer of the optical cable using at least one of a hexagonal crimp or a 4/8 indent crimp.

6. The optical cable assembly of claim 1, wherein the cable passage of the terminus body extends a length having a larger-diameter segment and a reduced-diameter segment that has a reduced diameter relative to the larger-diameter segment, the end of the optical cable comprising a buffer segment, along which the buffer surrounds the POF, and a POF segment wherein the POF is exposed, the buffer segment extending within the larger-diameter segment of the cable passage, the POF segment extending within the reduced-diameter segment, the crimp zone of the terminus body extending along the larger-diameter segment and the buffer segment.

7. The optical cable assembly of claim 1, wherein the terminus body comprises a shoulder that extends radially inwardly within the cable passage, the buffer of the optical cable comprising a buffer end that is engaged with the shoulder of the terminus body.

8. The optical cable assembly of claim 1, wherein the optical cable further comprises a strength member and a jacket, the strength member surrounding the buffer along a portion of the end of the optical cable, the jacket surrounding the strength member along a portion of the end of the optical cable, the strength member having a member segment that extends over an end of the terminus body, the socket terminus assembly further comprising a crimp sleeve having a terminus segment and a cable segment that are crimped over, in engagement with, the member segment of the strength member and the jacket, respectively.

9. The optical cable assembly of claim 1, wherein the socket terminus assembly comprises a discrete hood that is removably mounted to the terminus body, the hood having a mating receptacle that extends from the cable passage of the terminus body, the tip segment of the POF extending within the mating receptacle such that the tip surface of the POF is exposed within the mating receptacle, the mating receptacle being configured to receive the mating POF therein such that the tip surface of the POF is engaged with the mating POF.

10. The optical cable assembly of claim 1, wherein the socket terminus assembly comprises a hood having a mating receptacle that extends from the cable passage of the terminus body, the tip segment of the POF extending within the mating receptacle such that the tip surface of the POF is exposed within the mating receptacle, the mating receptacle being configured to receive the mating POF therein such that the tip surface of the POF is engaged with the mating POF, wherein the socket terminus assembly does not include an alignment sleeve that is held within the mating receptacle of the hood.

11. The optical cable assembly of claim 9, wherein the mating receptacle is tapered radially inward to a neck segment, a radially outer surface of the tip segment of the POF being engaged with an interior wall of the hood at the neck segment.

12. The optical cable assembly of claim 11, wherein the POF comprises a core and a cladding that surrounds the core, the cladding comprising the radially outer surface of the tip segment of the POF.

13. The optical cable assembly of claim 9, wherein the socket terminus assembly does not include an alignment sleeve that is held within the mating receptacle of the hood.

* * * * *